Patented Mar. 3, 1953

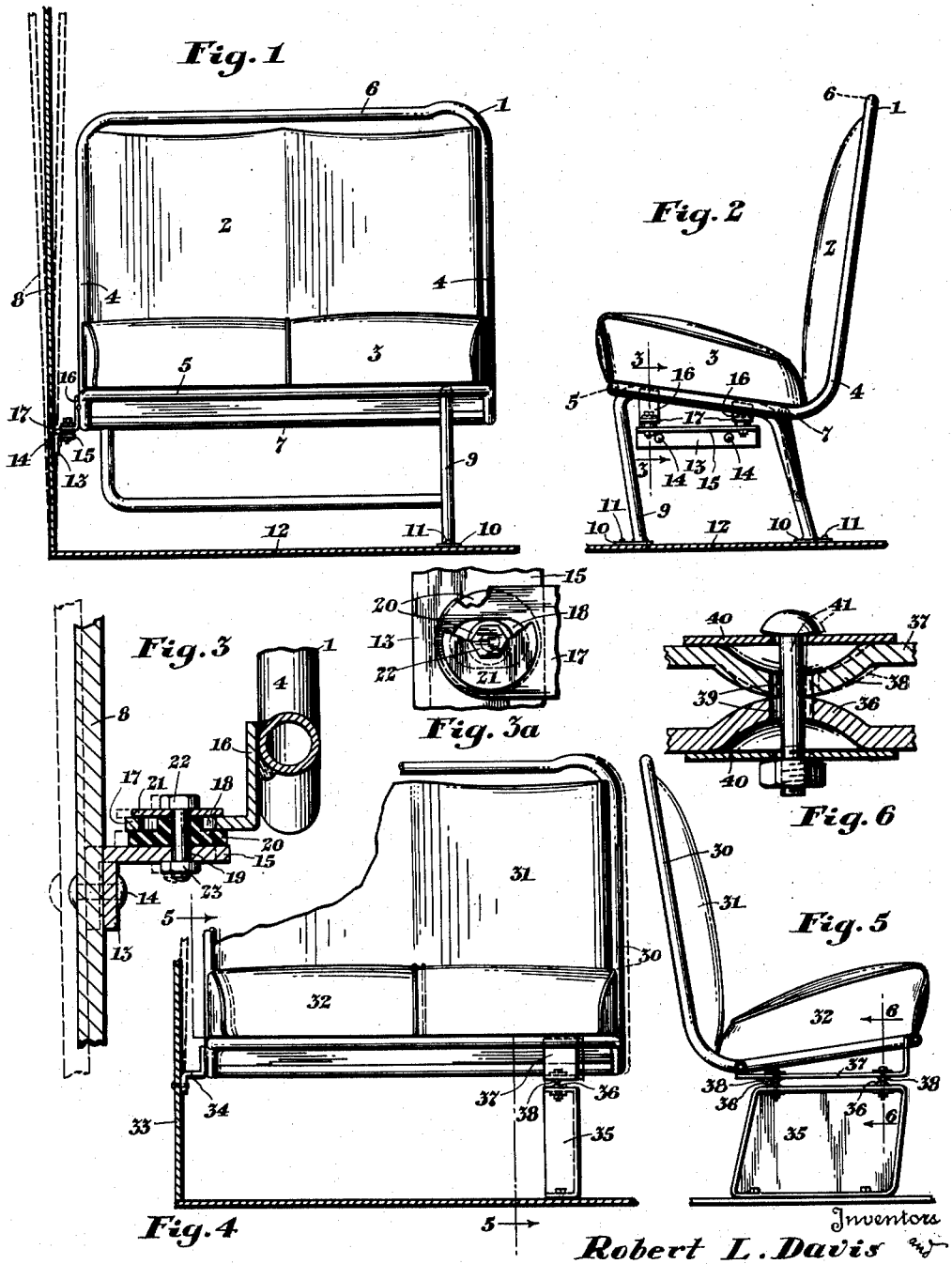

2,630,158

UNITED STATES PATENT OFFICE 2,630,158

CHAIR SUPPORT

Robert L. Davis and William R. Van Loo, Grand Rapids, Mich., assignors to American Seating Company, Grand Rapids, Mich., a corporation of New Jersey Application March 29, 1948, Serial No. 17,724

5 Claims. (Cl. 155—9)

The present invention relates to vehicle chairs and more particularly to chairs adapted for installation in motorbusses, airplanes and other relatively lightweight vehicles for occupancy by the passengers therein.

Vehicle passenger chairs commonly comprise a seat and back, usually upholstered, mounted upon a metal frame secured as by bolts or rivets to the floor of the vehicle or, and less frequently, with one end of the frame secured to the floor of the vehicle and the other end of the frame secured to the side wall of the vehicle. The latter method of mounting chairs in vehicles has generally been avoided in the past, and particularly in lightweight vehicles, because the flexibility of such a vehicle permits of some distortion and the side wall has a slight angular movement relative to the floor during the vehicle's travel. The side wall of the vehicle thus deviates from its normal position perpendicular to the floor, and such movement tends to pull apart the seat frame. This is particularly true when the seat frame consists of metal tubing or angle bars welded together, because the frame pulls apart more readily adjacent the welded joints. Attempts to remedy this condition by strengthening the frame, as by making it of heavier metal, or by bracing, have proven not only uneconomical but also more or less unsatisfactory because even these stronger frames will break under long continued stresses and strains.

Our approach to this problem is entirely different from earlier attempts at its solution, because instead of attempting to strengthen the chair frame so that it will not be so likely to break, we provide a frame which itself has a limited degree of flexibility to compensate for the above mentioned flexibility of the vehicle. The object of the invention is, therefore, to provide a vehicle chair having a supporting frame secured at one end to the floor of the vehicle and at the other end to the vehicle's side wall and which frame has a limited flexibility so that it will yield somewhat to forces which tend to distort it or to break it, thus prolonging the life of the frame and permitting the use of lightweight materials in minimum quantities in the construction of such chairs.

Illustrative embodiments of the invention are shown in the accompanying drawings wherein:

Figure 1 is a front elevational view of a chair mounted in a motor bus or other vehicle, the floor and a side wall of said vehicle being shown fragmentarily in transverse vertical section;

Figure 2 is a side elevational view of the same;

Figure 3 is an enlarged fragmentary vertical sectional view of parts thereof, taken on line 3—3 of Figure 2;

Figure 3a is a fragmentary top plan view of certain of the parts shown in section in Figure 3;

Figure 4 is a fragmentary front elevational view similar to Figure 1 and showing a modified form of chair supports;

Figure 5 is a view of the same partly in side elevation and partly in vertical section taken on line 5—5 of Figure 4;

Figure 6 is an enlarged fragmentary sectional view of certain parts, taken on line 6—6 of Figure 5;

Referring now in detail to these drawings, and referring first to that form of the invention disclosed in Figures 1–3a, the bus type chair there shown generally comprises a frame 1 upon which is conventionally mounted an upholstered chair back 2 and an upholstered chair seat 3. As here shown the frame 1 is fabricated from metal tubing to form L-shaped side frame portions 4 connected by a lower front rail 5, an upper back rail 6 and a cross-tie 7 welded at its opposite ends to the side frame portions 4 respectively. The chair shown is of the transverse type, i. e. it is mounted in the vehicle transverse the vehicle's direction of travel, between a side wall 8 of the vehicle and a center aisle therein. As shown in Figures 1–3a the aisle side of the chair is rigidly supported by an inverted U-shaped, tubular seat supporting member 9 welded to the front rail 5 and cross-tie 7 of the frame 1 and having depending front and rear legs provided with feet 10 fixedly secured by means of bolts or rivets 11 to the floor 12 of the vehicle.

The wall side of the chair is supported by means of another seat supporting member or bracket 13 comprising a right angle bar having one flange thereof secured as by rivets 14 to the side wall 8 of the vehicle and the other flange 15 thereof extending laterally inwardly from said side wall. Angle brackets 16 are secured in spaced relation to the side frame portion 4 adjacent the side wall 8 of the vehicle, said angle brackets having vertical flanges secured as by welding to the frame and horizontal flanges forming arms 17 extending laterally toward the bracket 13 on the side wall 8. The arms 17 have laterally elongated slots 18 therethrough in vertical registry with spaced apertures 19 in the wall bracket's flange 15. A resilient grommet 20 of rubber or the like is desirably interposed between each arm 17 and the wall bracket's flange 15, said grommets 20 having portions surrounding the eyes of the grommets which extend upwardly into the slots 18 of arms 17 (see Figures 3 and 3a). Washers 21 of greater diameter than the slots 18 are disposed adjacent the faces of the arms 17 opposite the grommets 20, and the parts are all secured in assembly by means of bolts 22 extending downwardly through the washers 21, through the eyes of the grommets 20 and through the apertures 19 in the wall bracket's flange 15, said bolts 22 being provided with nuts 23 threaded on the lower ends thereof.

It will be seen that the above described "pin-and-slot" connection between the vehicle's side wall 8 and the wall side of the chair provides for sliding interrelative movement between the arm 17 on the chair and the bracket 15 on the side wall, and that during the vehicle's travel the side wall 8 may flex laterally relative to the floor 12 as indicated by the dotted lines of Figures 1 and 3 without placing lateral stress or strain on the chair's frame 1. The life of the chair frame is thus substantially increased, and it will readily be seen that a minimum quantity of lightweight material may therefore be used in the fabrication of the frame without any loss of requisite strength.

The modification of the invention shown in Figures 4-6 comprises a chair frame 30, back 31 and seat 32 similar to that described above. In this modification, the wall side of the seat is rigidly secured to the side wall 33 of the vehicle as by means of a Z-shaped bracket 34. The aisle side of the seat is supported by a pedestal 35 rigidly secured to the floor of the vehicle and having a pair of upwardly projecting domes 36 thereon. A plate 37 is secured to the underside of the chair frame 30 and has a pair of downwardly projecting domes 38 thereon supported upon the domes 36 of the pedestal 35 for limited movement thereon. The pairs of domes 36, 38 have registering central apertures 39 therethrough (see Fig 6), through which and through washers 40 pass a bolt 41 of lesser diameter than the apertures 39. It will be seen that this construction provides a sliding connection between the chair and a fixed support at the aisle side thereof, so that the side wall 33 of the vehicle, and the chair, are permitted limited lateral movement relative to the floor during the vehicle's travel.

It will thus be seen that the invention provides means for mounting a chair in a vehicle in such manner that its aisle side is secured to the vehicle's floor and its wall side is secured to the vehicle's side wall, and in such manner that flexing of the vehicle's side wall relative to its floor is compensated for by sliding movement in the mountings for the chair, thus to relieve the chair's supporting frame from stresses and strains tending to break it. Other structures may be contrived for accomplishing this result, and it will therefore be understood that our invention includes any and all such structures as fall within the scope, or the spirit, of the invention as defined by the following claims.

We claim:

1. In combination with a vehicle having a floor and an upstanding side wall, a seat in the vehicle comprising a rigid frame having supporting legs at one side thereof fixedly secured to the floor of the vehicle, a chair seat and back mounted on the frame, supporting means for the other side of the frame comprising a supporting bracket mounted on the side wall of the vehicle, an arm on the frame extending toward the bracket, and a pin and slot connection between said arm and said bracket permitting lateral sliding movement therebetween.

2. In combination with a vehicle having a floor and an upstanding side wall, a seat in the vehicle comprising a rigid frame having supporting legs at one side thereof fixedly secured to the floor of the vehicle, a chair seat and back mounted on the frame, supporting means for the other side of the frame comprising a supporting bracket mounted on the side wall of the vehicle and having an aperture therethrough, an arm on the frame extending toward the bracket and having a laterally elongated slot therethrough, and fastening means passing through said slot and said aperture whereby the arm and the bracket are secured together for lateral interrelative sliding movement.

3. In combination with a vehicle having a floor and an upstanding side wall, a seat in the vehicle comprising a rigid frame having supporting legs at one side thereof fixedly secured to the floor of the vehicle, a chair seat and back mounted on the frame, supporting means for the other side of the frame comprising a supporting bracket mounted on the side wall of the vehicle and having an aperture therethrough, an arm on the frame extending toward the bracket and having a laterally elongated slot therethrough, a resilient grommet interposed between said arm and said bracket, and fastening means passing through said slot, through the eye of the grommet and through the bracket's aperture whereby the arm and the bracket are secured together for cushioned interrelative sliding movement.

4. In combination with a vehicle having a floor and an upstanding side wall, a seat in the vehicle comprising a rigid frame having supporting legs at one side thereof fixedly secured to the floor of the vehicle, a chair seat and back mounted on the frame, supporting means for the other side of the frame comprising a supporting bracket mounted on the side wall of the vehicle and having an aperture therethrough, an arm on the frame extending toward the bracket and having a laterally elongated slot therethrough, a resilient grommet interposed between said arm and said bracket, said grommet having a portion surrounding the eye thereof extending into said slot, a washer of greater diameter than said slot disposed adjacent the face of the arm opposite said grommet, a bolt passing vertically through said washer, through the eye of the grommet and through the bracket's aperture whereby the arm and the bracket are secured together for cushioned interrelative sliding movement.

5. In combination with a vehicle having a floor and an upstanding side wall, a seat in the vehicle comprising a rigid frame, a supporting member for one side of said frame fixedly secured to the floor of the vehicle, a supporting member for the other side of the frame mounted on the side wall of the vehicle, an arm on the frame extending toward one of said supporting members, a pin and slot connection between said arm and said supporting member permitting lateral sliding movement therebetween, and a chair seat and back mounted on the frame.

ROBERT L. DAVIS.
WILLIAM R. VAN LOO.

(References on following page)

REFERENCES CITED

The following references are of record in the file of this patent:

UNITED STATES PATENTS

| Number | Name | Date |
|---|---|---|
| 1,637,780 | Masury | Aug. 2, 1927 |
| 1,937,055 | Curtiss | Nov. 28, 1933 |
| 2,091,113 | Cook | Aug. 24, 1937 |
| 2,259,534 | Reynolds et al. | Oct. 21, 1941 |

FOREIGN PATENTS

| Number | Country | Date |
|---|---|---|
| 241,462 | Great Britain | Oct. 22, 1925 |
| 270,138 | Great Britain | May 5, 1927 |
| 274,216 | Great Britain | July 20, 1927 |
| 788,848 | France | Aug. 5, 1935 |